United States Patent [19]

Wakeem

[11] 4,405,090
[45] Sep. 20, 1983

[54] METHOD AND APPARATUS FOR REDUCING TIRES

[76] Inventor: Dale Wakeem, Rte. 2, Box 539, Lamar, Mo. 64759

[21] Appl. No.: 193,904

[22] Filed: Oct. 6, 1980

[51] Int. Cl.³ .............................................. B02C 19/12
[52] U.S. Cl. .......................................... 241/3; 83/408; 83/923; 241/24; 241/DIG. 31
[58] Field of Search .................... 241/24, 25, 79, 79.1, 241/101 R, 101.4, 280, 278 R, 3, DIG. 31; 83/408, 488, 923

[56] References Cited

U.S. PATENT DOCUMENTS

| 419,464 | 1/1890 | Mitchell | 241/78 |
| 2,136,099 | 11/1938 | Buxbaum | 241/14 |
| 3,364,526 | 1/1968 | Varady et al. | 241/101.4 X |
| 3,459,246 | 8/1969 | Ottosson | 241/14 |
| 3,593,929 | 7/1971 | Hughes | 241/146 |
| 3,658,267 | 4/1972 | Burwell | 241/301 |
| 3,721,392 | 3/1973 | Burwell | 241/200 X |
| 3,911,772 | 10/1975 | Kisielewski | 83/278 |
| 3,923,256 | 11/1975 | Dorner | 241/76 |
| 4,104,944 | 8/1978 | Janssen | 83/488 X |

Primary Examiner—Mark Rosenbaum
Assistant Examiner—Timothy V. Eley
Attorney, Agent, or Firm—Kokjer, Kircher, Bradley, Wharton, Bowman & Johnson

[57] ABSTRACT

A method and apparatus for reducing worn out automobile and truck tires to useful particles of rubber and steel. The apparatus includes a conveyor which carries the tires through a cutting mechanism in the form of a pair of transverse saw blades and a single longitudinal saw blade. The saw blades cut each tire into four pieces which are fed down an inclined chute against the abrasive surface of a grinding wheel. The tire pieces are ground by the wheel into small particles of rubber and steel which are separated from one another by a magnetic conveyor.

4 Claims, 3 Drawing Figures

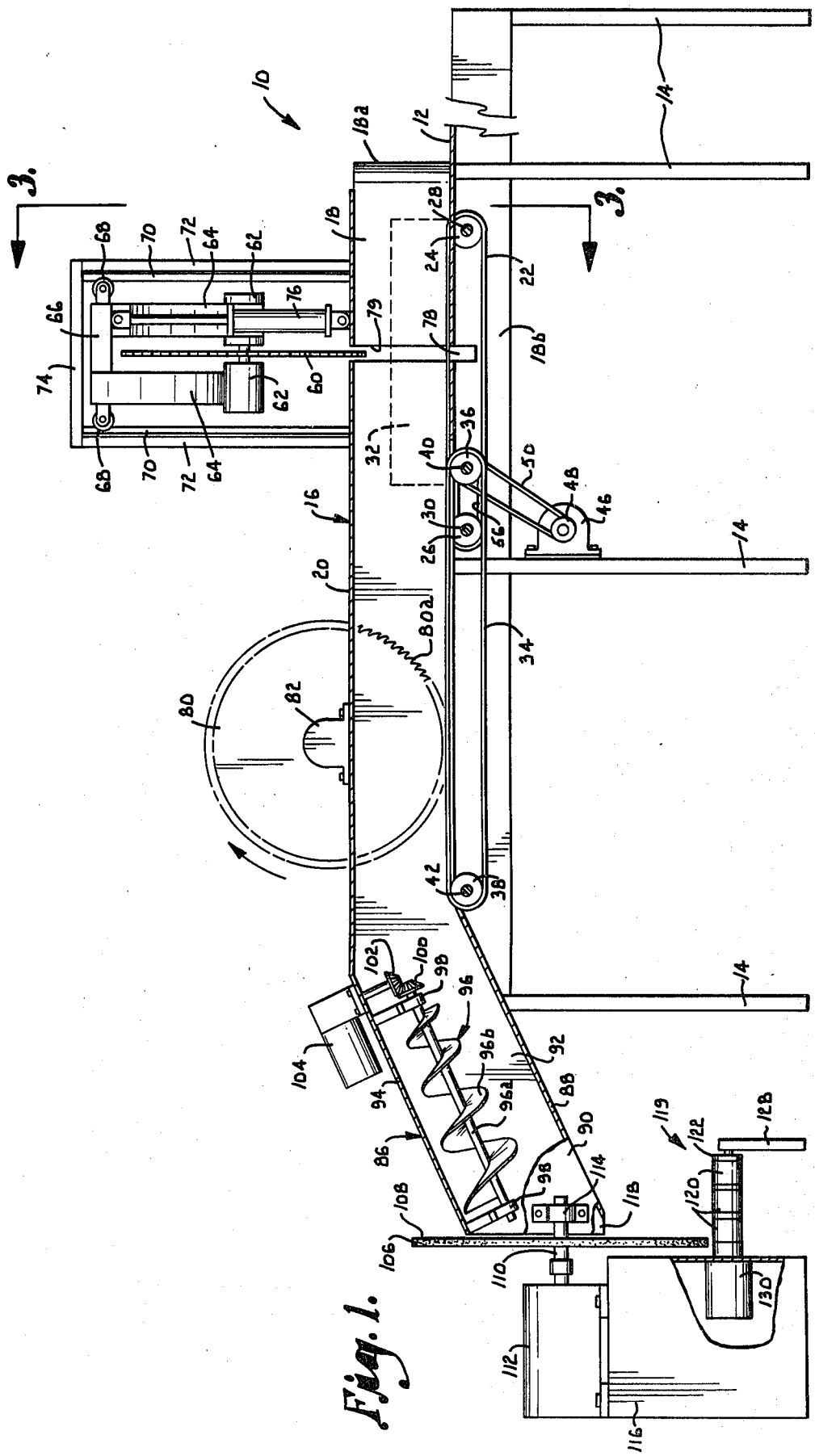

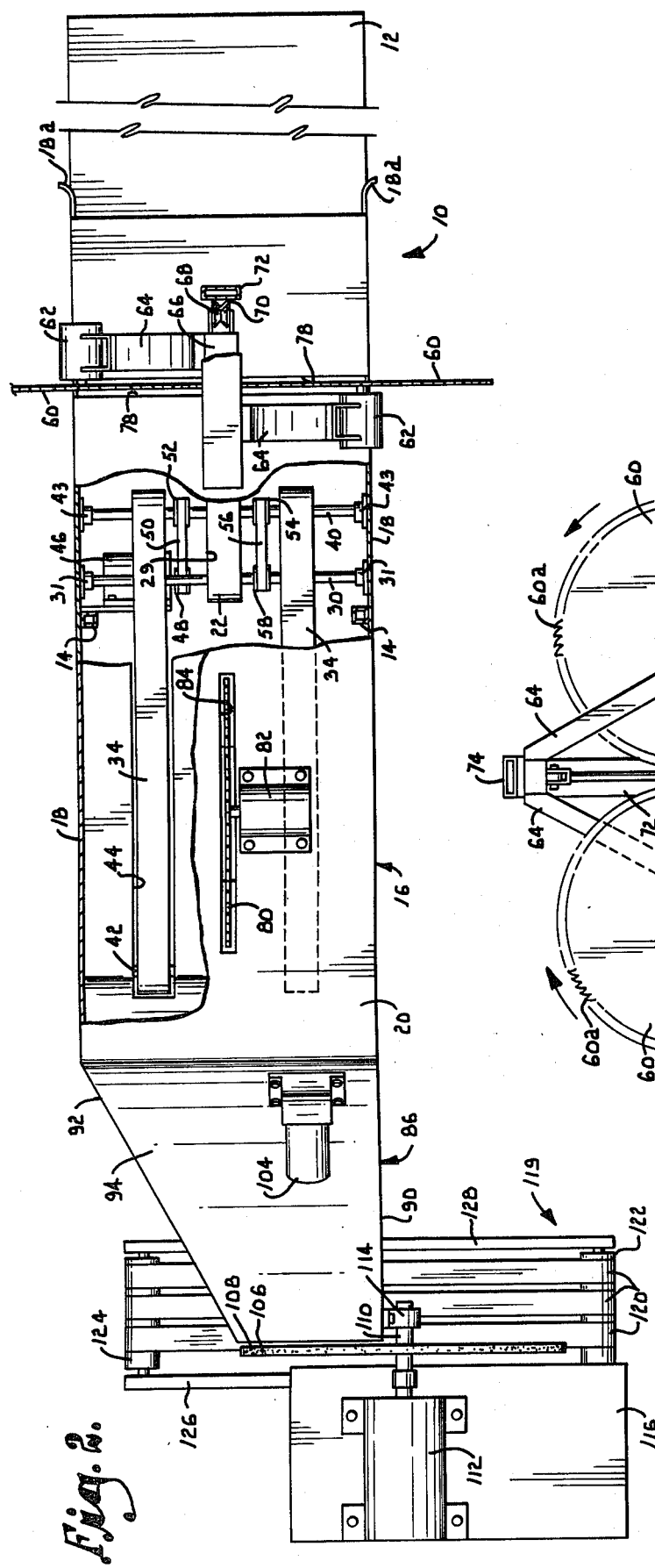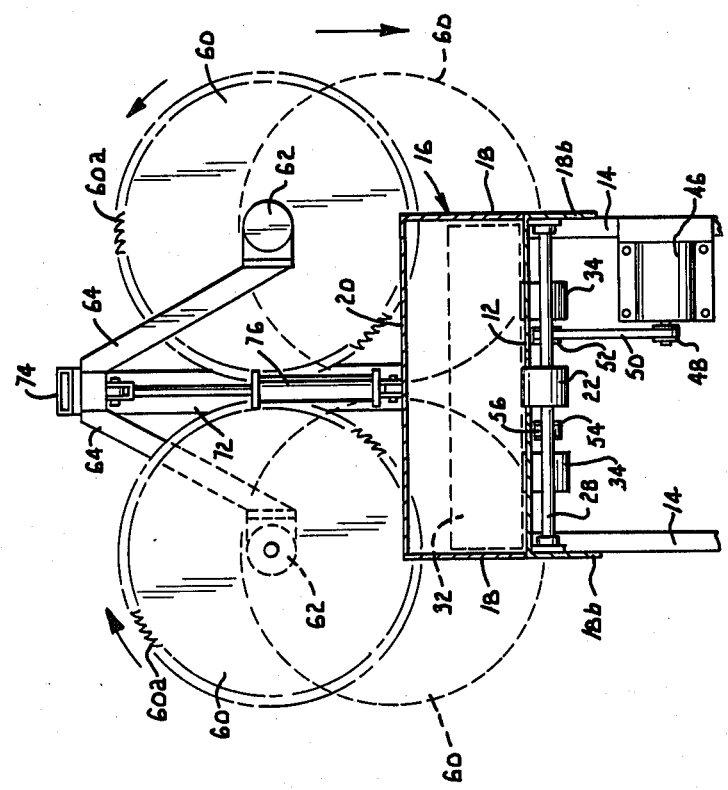

METHOD AND APPARATUS FOR REDUCING TIRES

BACKGROUND AND SUMMARY OF THE INVENTION

This invention relates to an improved method and apparatus for reducing worn out tires to particles of rubber and steel.

Despite its potential value, the rubber and steel content of worn out automobile and truck tires is seldom recovered. The rubber is useful in the making of asphalt and similar materials, and the steel is valuable as scrap metal. The principal reason that no attempt is ordinarily made to salvage the rubber and steel is the unavailability of suitable equipment which is capable of reducing the tires in an economical manner.

The present invention is aimed at overcoming this problem and has, as its primary object, the provision of a practical method and apparatus for reclaiming substantially the entire rubber and steel content of tires.

Another object of the invention is to provide a method and apparatus of the character described in which the tire is first cut into relatively large pieces which are then ground into small particles of rubber and steel.

Yet another object of the invention is to provide a method and apparatus of the character described wherein the tire is reduced to rubber and steel particles in a simple and economical manner.

A further object of the invention is to provide a method and apparatus of the character described in which the steel particles are effectively separated from the rubber particles.

An additional object of the invention is to provide an apparatus of the character described which operates reliably and is well suited for high speed operation by a single operator.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are used to indicate like parts in the various views:

FIG. 1 is a side elevational view of a tire reduction machine which operates to reduce worn out tires to particles of steel and rubber in accordance with the present invention, portions of the machine being broken away for purposes of illustration;

FIG. 2 is a top plan view of the machine shown in FIG. 1, with portions broken away for purposes of illustration; and FIG. 3 is a fragmentary sectional view taken generally along line 3—3 of FIG. 1 in the direction of the arrows, with the broken lines indicating movement of the transverse saw blades to their cutting position.

With initial reference to FIGS. 1 and 2, numeral 10 generally designates a machine which operates to reduce worn out automobile and truck tires to particles of rubber and steel. The machine 10 has a frame which includes a horizontal table 12 supported on top of a plurality of upright legs 14. Mounted on table 12 is a conveyor housing generally indicated at 16. Table 12 extends into housing 16 and provides a conveyor surface along which the tires are conveyed. Opposite side walls 18 of the conveyor housing are spaced apart from one another a distance slightly greater than the diameter of the tires which are handled by the machine. Side walls 18 extend above the table 12 a distance somewhat greater than the width of the tires. A top panel 20 of the conveyor housing extends between the upper edges of side panels 18. The right end of housing 16 is open to provide an open inlet end of the conveyor housing, and side panels 18 are curved outwardly in flared fashion at the inlet end as indicated at 18a in FIG. 2. The flared inlet facilities entry of the tires into the conveyor housing along table 12.

The conveyor mechanism within housing 16 includes a first conveyor belt 22 which is drawn around a pair of spaced apart pulleys 24 and 26. Pulleys 24 and 26 are mounted on respective shafts 28 and 30 which are located such that the upper run of the conveyor belt travels slightly above the surface of table 12. The belt 22 passes through a slot 29 formed in table 12. Shafts 28 and 30 are mounted to extend parallel to one another between downwardly extending portions 18b of the side walls 18 of the conveyor housing. Bearings 31 mounted to wall portions 18b provide rotative support for the opposite ends of the shafts. Conveyor belt 22 is located centrally on the conveyor surface provided by table 12, and it acts to convey tires such as that shown in broken lines and designated by numeral 32. The tires 32 handled by the machine are annular and are constructed conventionally of rubber and steel belts.

The conveyor also includes a second pair of belts 34 located downstream of conveyor belt 22. Belts 34 are mounted on pulleys 36 and 38. The pulleys are supported on respective shafts 40 and 42 which are spaced apart from one another in extension between bearings 43 mounted to lower portions 18a of side wall 18. Belts 34 pass through openings 44 (FIG. 2) formed in table 12, and the upper runs of the belts are located slightly above table surface 12 parallel to one another. Shaft 40 is located upstream of shaft 30 such that belts 34 overlap belt 22, with the downstream end of belt 22 located midway between the upstream ends of belts 34. The tires are thus delivered from belt 22 onto belts 34.

The drive system for the conveyor includes a conventional electric motor 46 mounted to one of the frame legs 14. Motor 46 drives a pulley 48 around which a belt 50 is passed. Belt 50 is also passed around a pulley 52 (FIG. 2) which is mounted on shaft 40. Shaft 40 is thus driven in a direction to properly drive belts 34. Shaft 40 carries another pulley 54 which drives a belt 56. Belt 56 is also passed around a pulley 58 mounted on shaft 30, thereby driving conveyor belt 22 in the proper direction.

Machine 10 includes a cutting mechanism which cuts each tire 32 into four pieces of equal size. The cutting mechanism includes a pair of transverse saw blades 60 which are circular blades having sharp peripheral teeth 60a. Blades 60 are driven about their centers by small electric motors 62 which are carried on the lower end of inclined mounting arms 64. Arms 64 connect at their upper ends with the opposite ends of a short horizontal beam 66 carrying grooved wheels 68 at its opposite ends. The grooved wheels 68 ride up and down on vertical angles 70. The angles are secured to upright posts 72 which are suitably attached at their lower ends to the top panel 20 of the conveyor housing. Posts 72 are interconnected at their top ends by a horizontal beam 74.

The saw blades 60 are moved upwardly and downwardly by a hydraulic cylinder 76 which is pinned at its lower or base end to panel 20 and at its upper or rod end to beam 66. Extension of the rod of cylinder 76 raises blades 60 to the position shown in FIG. 1 and in solid lines in FIG. 3. In the raised position, blades 60 are located well above the tire 32 located on belt 22. Retraction of the rod of cylinder 76 lowers blades 60 to the cutting position shown in broken lines in FIG. 3. In the cutting position, the lower portions of blades 60 are located below table 12 and extend through slots 78 formed in the table on opposite sides of belt 22. The blades also extend through a slot 79 formed in side walls 18 and top panel 20 of the conveyor housing. Blades 60 are located side by side in the same vertical plane and are oriented perpendicular to the direction of travel of the tire 32 along the straight conveyor path defined by conveyor belts 22 and 34.

The cutting mechanism includes a third circular saw blade 80 having sharp peripheral teeth 80a. Blade 80 is driven rotatively about its center by a stationary electric motor 82 mounted on the top panel 20 of the conveyor housing. Blade 80 is located in a vertical plane oriented parallel to the direction of travel of the tires along the conveyor. Saw blade 80 projects through a slot 84 (FIG. 2) formed in table 12 and located centrally between belts 34. The lower portion of blade 80 is located below table 12, and motor 82 drives the blade in the direction indicated by the directional arrow in FIG. 1.

The downstream conveyor belts 34 discharge the tires to a chute which is generally designated by reference numeral 86. A downwardly inclined surface 88 forms the bottom of chute 86 and angles downwardly from table 12. The upper end of surface 88 is located beneath the discharge ends of belts 34. Opposite side walls 90 and 92 of the chute extend upwardly from surface 88, and the chute has a top panel 94 extending between the upper edges of side walls 90 and 92. As shown in FIG. 2, side wall 92 tapers toward side wall 90 as it extends away from conveyor housing 16.

Chute 86 contains an auger 96 having a shaft 96a supported on bearings 98 and carrying a bevel gear 100 at one end. Mating with gear 100 is another bevel gear 102 which is driven by an electrical motor 104 mounted on the top panel 94 of chute 86. The shaft 96a of auger 96 is oriented parallel to and above the sloping bottom surface 88 of the chute. The auger flights 96b increase in size as they extend downwardly and assist in directing the tire pieces downwardly along surface 88, as will be more fully explained.

A grinding wheel 106 has a roughened abrasive surface 108 located adjacent to and facing the lower or outlet end of chute 86. Wheel 106 is oriented vertically and is driven about its center by a shaft 110 which forms the output shaft of an electric motor 112. The opposite end of shaft 110 is supported on a bearing 114 mounted to side wall 90 of the chute. Motor 112 is mounted on top of a pedestal 116 having a hollow interior. As shown in FIG. 1, the inclined surface 88 has a transverse opening or slot 118 which extends between side walls 90 and 92 at a location adjacent the abrasive surface of grinding wheel 106. The lower end of chute 86 is offset from the rotational axis of grinding wheel 106, as best shown in FIG. 2.

The steel particles of the tire are separated from the rubber particles by a magnetic conveyor 119 having a plurality of parallel conveyor belts 120 oriented perpendicular to belts 22 and 24. Belts 120 underlie slot 118 immediately below the lower edge of wheel 106 and are mounted on a pair of rollers 122 and 124. Roller 124 is supported for rotation by a pair of frame members 126 and 128, and roller 122 is supported by frame member 128 at one end and by pedestal 116 at the opposite end. An electric motor 130 is mounted within pedestal 116 and drives roller 122 in order to drive the conveyor belts 120.

Belts 120 may be any desired length, and the portions of the belts located beneath grinding wheel 106 are electromagnetic such that the steel particles adhere to them while the non-magnetic rubber particles pass on downwardly between the belts where they can be collected in any desired manner. The steel particles which adhere to belts 120 may be removed therefrom in any suitable manner, such as by demagnetizing the belts as they pass over pulley 124

In operation, tires are placed on the end of table 12 and are fed one by one into the inlet end of conveyor housing 16. Conveyor belt 22 is driven to carry each tire beneath the traverse saw blades 60 to the position shown in FIG. 1. The conveyor belts are then stopped, either by manually throwing a switch or by a switch which is automatically tripped when the tire reaches the preselected FIG. 1 position. Cylinder 76 is operated to retract its rod, thereby lowering saw blades 60 to the cutting position shown in broken lines in FIG. 3. As they are lowered, blades 60 are rotated by motors 62 in opposite directions as indicated by the directional arrows in FIG. 3. Lowering of blades 60 thus effects a pair of transverse cuts through opposite side portions of the annular tire to separate the tire into a pair of equally sized pieces. The close fit of the tire between side walls 18 helps to maintain the tire in position as it is cut by the saw blades.

Immediately after completion of its cutting stroke, cylinder 76 is extended to raise saw blades 60. The conveyor is then started again, either by manually throwing a switch or by means of a switch which is tripped when blades 60 are raised. Driving of belts 22 and 34 is then resumed, and the tire pieces are transferred from belt 22 onto belts 34.

Belts 34 convey the tire pieces through the third saw blade 80 which cuts each piece in a direction parallel to its direction of travel along the conveyor. The four tire pieces are discharged from conveyor belts 34 onto the inclined surface 88 of chute 86. The tire pieces slide downwardly along chute 88 under the influence of gravity toward the grinding wheel 106. Auger 96 may be rotated by motor 104 to assist in directing the tire pieces against the abrasive surface 108 of grinding wheel 106. It should be pointed out that auger 96 may be eliminated in situations where surface 88 is inclined sufficiently to properly deliver the tire pieces against surface 108 of the grinding wheel. In other cases, the auger is necessary in order to properly feed the tire pieces against the abrasive surface 108.

In any event, the tire pieces are fed against the rotating grinding wheel, and its abrasive surface 108 acts to grind the tire pieces into small particles of rubber and small particles of steel. When the particles are ground down to a size small enough to pass through slot 118, they fall through the slot toward the magnetic conveyor 119. The steel particles adhere to the electromagnetized belts 120, while the nonmagnetic rubber particles pass downwardly between the belts and may be collected for use in making asphalt or for any other suitable purpose. The steel particles are carried along the conveyor belts 120 and are eventually collected and used as metal scrap.

Prior to reaching the abrasive grinding wheel 106, each tire is cut into four equally sized pieces by the cutting mechanism of the machine. Consequently, the tire pieces which are fed against wheel 106 are small enough that they can be readily ground by the wheel into small particles of rubber and steel. The tapering side wall 92 of chute 86 assists in guiding each tire piece against the grinding wheel 106 and prevents the pieces from becoming jammed up within the chute. It is to be understood that separating means other than the magnetic conveyor belts 120 may be used to separate the rubber particles from the steel particles.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A method of reducing a tire having rubber and metal content, said method comprising the steps of:
    conveying the tire along a conveyor path to a first cutting station;
    effecting a first pair of cuts through opposite sides of the tire at said first cutting station to cut the tire into a pair of arcuate pieces approximately equal in size without human assistance;
    conveying the arcuate pieces from said first cutting station to a second cutting station;
    effecting a cut through each of said arcuate pieces at said second cutting station, each cut at said second cutting station being made without human assistance in a direction generally perpendicular to the first pair of cuts and at a location approximately halfway along the arc defined by each arcuate piece, thereby cutting the tire into four pieces approximately equal in size;
    conveying the tire pieces from said second cutting station to a grinding station;
    grinding each tire piece into small particles of rubber and small particles of metal at said grinding station; and
    separating the particles of rubber from the particles of metal.

2. A method as set forth in claim 1, wherein said step of effecting a first pair of cuts comprises effecting the first pair of cuts through the tire in a direction generally transverse to its direction of travel along the conveyor path at said first cutting station, and said step of effecting a cut through each of said arcuate pieces comprises cutting through each arcuate piece in a direction generally parallel to its direction of travel along the conveyor path at said second cutting station.

3. A method as set forth in claim 1, wherein said grinding step comprises directing the tire pieces against a moving abrasive surface.

4. A method as set forth in claim 3, wherein said abrasive surface moves in a substantially vertical plane and the tire pieces are directed against the abrasive surface in a direction inclined from horizontal.

* * * * *